INVENTORS
Peter DeLaurentis
Douglas A. Newman
BY
Johnson and Kline
ATTORNEYS

# 3,695,912
THERMAL COPYING METHOD AND PRODUCTS
Peter De Laurentis, Massapequa, and Douglas A. Newman, Glen Cove, N.Y., assignors to Columbia Ribbon and Carbon Manufacturing Co., Inc., Glen Cove, N.Y.
Filed Oct. 19, 1970, Ser. No. 81,730
Int. Cl. B41m 5/22
U.S. Cl. 117—36.2            10 Claims

ABSTRACT OF THE DISCLOSURE

Heat-sensitive color-forming projection transparency assemblies for the production of stable colored transparency copies of an imaged original by means of infrared radiation. The assemblies comprise a transfer sheet carrying a heat-transferable aromatic acid and a plastic film receptor sheet coated with an acid-sensitive dye precursor in a resinous binder system comprising a mixture of a minor amount of a vinylidene chloride polymer and a major amount of a second polymer which is compatible therewith.

---

According to known thermographic copying methods, images can be formed on a copy sheet by means of the imagewise heat-transfer of a chemical compound from a transfer sheet into heat-reactive association with a complementary chemical compound on the copy sheet, whereby reacted colored areas are formed on the copy sheet in areas corresponding to the location of images on an original sheet.

In cases where the imaged copy sheet is to be used as a projection transparency, it is necessary that the copy sheet is light-transmissive to a high degree and that it is stable against changes in color for long periods of time at the temperature generated by conventional overhead projectors in the area of about 150° F.

Conventional thermographic copy papers employ solid color-forming reactants and the developed color is in the nature of a solid pigment whereby the copy is termed "permanent." However such solid color-formers are not used in a coating on a projection transparency film because they block or refract light so that the film is not sufficiently light-transmissive even in the background unreacted areas.

One class of color-formers suitable for projection transparency use is the acid-sensitive amino phenyl methane dye precursors. Such materials may be dissolved in a suitable resin binder and coated onto a clear film so that they are imperceptible to the naked eye and they do not refract light. The imagewise transfer of an aromatic acid to such coatings develops the dye precursor into intense colored dye images which contrast sharply with the clear background.

The principal problem encountered with the use of such dye precursors is their lack of stability in most resinous binder systems. Thus when the imaged transparency film is stored or is projected, the imaged areas fade and lose their sharpness and eventually cannot be projected.

The present invention is concerned with overcoming these problems relating to the lack of stability of projection transparency films coated with acid-sensitive dye precursors. This and other objects and advantages of the present invention will be clear to those skilled in the art.

Reference is made to the accompanying drawing.

Figure 1:
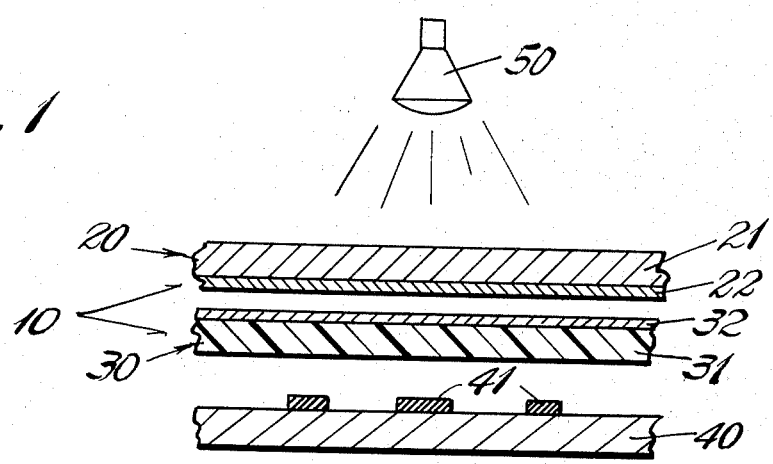
FIG. 1 is a diagrammatic cross-section, to an enlarged scale, of a projection transparency assembly according to this invention, superposed with an imaged original sheet under the effects of infrared radiation, the sheets being spaced for purposes of illustration.

The present invention involves the discovery that vinylidene chloride polymers provide exceptional stability as binder materials for acid-sensitive dye precursors on projection transparency films provided that such polymers are used in association with a major amount by weight of another polymer which is compatible with the vinylidene chloride polymer.

Vinylidene chloride polymers per se are completely inoperative for producing stable projection transparency films in that films based upon such polymers, as the sole binder material for the dye precursor, develop an increasingly intense dye color in the background areas with age and develop an intense dye color in the background areas after a short period of exposure on an overhead projector. This appears to be due to the tendency of the polymer to liberate small amounts of hydrochloric acid.

However the use of minor amounts of such polymers together with major amounts of polymers compatible therewith overcomes these defects and results in projection transparency films of exceptional stability.

The nature of the modifying polymer used in association with the vinylidene chloride polymer does not appear to be critical provided that the second polymer is compatible with the vinylidene chloride polymer and soluble in a volatile solvent which is also a solvent for the vinylidene chloride polymer and a solvent for the dye precursor. Vinyl polymers in general are most suitable in these respects. Preferred vinyl polymers are styrene homopolymers and copolymers such as styrene-acrylonitrile, polyvinyl acetate, acrylic and methacrylic acid and ester homopolymers and copolymers, such as polymethyl methacrylate, and the like.

The preferred vinylidene chloride polymer is a copolymer of vinylidene chloride and acrylonitrile. However polyvinylidene chloride homopolymer is also suitable as are the copolymers of vinylidene chloride with vinyl acetate, styrene, and the like.

The modifying polymers are completely unsuitable for use as the sole binder materials for the dye precursor because as soon as the dye precursors are reacted with the acid and their color is developed in such modifying polymers, their color begins to fade. The colored images fade or bleach rapidly upon projection due to the heat of the overhead projector. However the presence of the vinylidene chloride polymer prevents such fading and lends stability to the color of the developed dye precursor.

Unless the two polymers are compatible with each other and are present within certain relative proportions, the advantages of the present invention regarding color stability of the developed images and regarding stable clarity of the background areas are not obtained. The vinylidene chloride polymer is present in an amount equal to from about 5% by weight up to about 40% by weight, and preferably from 10% to 15% by weight, based upon the total weight of the binder material mixture. Thus the compatible modifying polymer constitutes from about 60% to about 95% by weight, and preferably from 85% to 90% by weight, of the mixture. Unless these polymers are compatible, i.e. cosoluble in the amounts used so as to produce a solid solution, the formed dye precursor layer will be cloudy or milky in appearance, rather than clear, and the product will not have the stability advantages of the present invention.

The selection of the colorless acid-sensitive dye precursor is not critical and a variety of such materials are commercially available. U.S. Pat. 3,230,875 is cited for its disclosure of a variety of p-dialkylamino phenyl methanes which are suitable for use according to this invention. Also cited is Allied Chemical U.S. Pat. 2,981,733 which discloses the blue-color-forming dye precursor sold by that company under the trademark Color Precursor No. 1, identified as 4-(bis (p-dimethylamino phenyl)

methyl) morpholine. Allied Chemical Color Precursor No. 21 is a yellow-color-forming dye precursor described in Example 3 of U.S. Pat. 3,346,571 and having the structure:

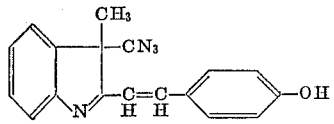

Allied Chemical Color Precursor No. 22 is a red-color-forming dye precursor described in Example 1 of U.S. Pat. 3,346,571 and having the structure:

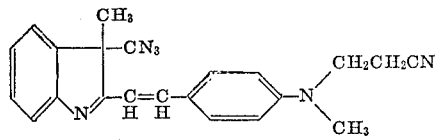

Mixtures of complementary dye precursors can be used to produce a variety of colors including black.

The amount of dye precursor present in the binder mixture may be varied depending upon the color intensity desired in the final copy. In general the dye precursor is present in an amount equal to from about 2% up to about 30% by weight and preferably from 4% to 10% by weight based upon the total dry weight of the layer. The dry weight of the layer preferably ranges from about 0.5 to 4 pounds per 3300 square feet of film.

The foundation for the present projection transparency sheets is a thin clear plastic film which preferably is heat-resistant, such as Mylar polyethylene terephthalate and cellulose acetate, but heat-contractile films such as polystyrene are also suitable. Film thicknesses between about 1 and 5 mils are suitable. The clear film may be colorless or tinted in color.

The present thermographic assemblies 10 are illustrated by FIG. 1 of the drawing. They comprise an acid-donor sheet 20 and a projection transparency sheet 30. The latter comprises the plastic film foundation 31 carrying the clear dye precursor layer 32.

The acid-donor sheet 20 comprises an infrared radiation-transmitting foundation 21 carrying an acid-donor layer 22. The foundation is preferably a clear thin heat-resistant plastic film having a thickness of from 0.2 to 2 mils, such as Mylar polyethylene terephthalate or cellulose acetate, but thin papers are also suitable.

The acid-donor layer 22 comprises a major amount by weight of an aromatic acid in a minor amount by weight of a resinous binder material. The preferred aromatic acids are those which volatilize at the thermographic transfer temperature which generally ranges from about 190° F. to about 225 °F. Preferred acids are salicylic acid, acetyl salicylic acid, 5-chloro-benzoic acid, and the like. The acid comprises from about 51% to about 90% and preferably from 60% to 80% of the total weight of the donor layer.

The resinous binder of the donor layer comprises from about 10% to about 49% by weight of the donor layer and may be any synthetic thermoplastic polymer which is soluble in a volatile solvent which also dissolves the aromatic acid and which has a softening temperature below or within the thermographic transfer temperature range, i.e. from about 150° F. to about 225° F. Preferred materials are the copolymers of butadiene with styrene and with acrylonitrile. Also suitable are the polybutene resins, acrylics such as butyl acrylate, and the like. The acid-donor layer is applied in a dry weight of from about ½ to 4 pounds per 3300 square feet.

The present assemblies 10 preferably comprise the acid-donor sheet 20 and the projection film 30 releasably attached to each other along one edge in unit form.

The following example is given to illustrate the production of a specific acid-donor sheet and a specific projection transparency film, and the use of the assembly of these sheets in the thermographic transfer process.

An acid-donor sheet is produced by coating a clear film of 0.5 mil thick Mylar polyethylene terephthalate polyester with a continuous layer of the following composition in a weight sufficient to form a dry layer having a weight of about 2 pounds per 3300 square feet of film:

| Ingredients: | Parts by weight |
|---|---|
| Butadiene-styrene polymer | 6.3 |
| Toluene | 14.4 |
| Salicylic acid | 14.3 |
| Methyl ethyl ketone | 60.0 |
| Methyl isobutyl ketone | 5.0 |
| Total | 100.0 |

The polymer is predissolved in the toluene and the solution is added to the solution of the salicylic acid. The composition is coated onto the film and the volatile solvents are evaporated to produce the acid-donor layer having a crystalline or frosted appearance due to the recrystallization of the salicylic acid.

A projection transparency film is produced by coating a clear film of 5.0 mils thick Mylar polyethylene terephthalate with a continuous layer of the following composition in a weight sufficient to form a dry layer having a weight of about 1 pound per 3300 square feet of film:

| Ingredients: | Parts by weight |
|---|---|
| Acrylonitrile-vinylidene chloride copolymer (Saran F–310) | 2.0 |
| Acrylonitrile-styrene copolymer (Tyril 780) | 14.0 |
| Color Precursor #1 Blue | 0.3 |
| Color Precursor #21 Yellow | 0.4 |
| Color Precursor #22 Red | 0.3 |
| Methyl ethyl ketone | 63.0 |
| Ethyl acetate | 10.0 |
| Toluene | 10.0 |
| Total | 100.0 |

The dye precursors are first completely dissolved in a portion of the total solvent and then mixed with the solution of the resins. The composition is applied as a continuous layer to the film foundation and the solvents are evaporated to form a dry colorless layer having a weight of about 1 pound per 3300 square feet of film which is imperceptible to the eye.

The donor and transparency sheets are cut to the desired dimensions and adhered to each other along the top edge by means of a weak adhesive line to form a unit, the acid-donor and dye precursor layers being positioned facing each other as illustrated by FIG. 1.

Figure 2:
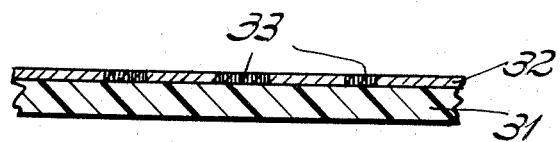
FIG. 2 illustrates the projection transparency film of FIG. 1 after the images have been formed thereon.

The unit is used to produce a copy of an imaged original sheet 40 by placing the images 41 of the original sheet against the foundation 31 of the projection transparency sheet 30 as shown in FIG. 1. The superposed sheets are exposed to an infrared radiation lamp 50 in a belt-type or roller-type thermal copier whereby the radiation is transmitted by the unit to the images 41 which absorb it and become heated to a temperature of from about 190° F. to 225° F. This heat is conducted to the acid-donor layer 22 to soften corresponding areas thereof. Similarly corresponding areas of the dye precursor layer become softened and the heated portions of both layers adhere to each other. The adhesion of the acid-donor layer to the dye precursor layer causes reaction between the materials and development of the dye precursor. The sheets are removed from the radiation source and are stripped apart whereby the dye precursor layer 32 on the projection transparency film has developed image areas 33 corresponding to the image areas of the original sheet, as shown in FIG. 2 of the drawing.

The imaged projection transparency film may be exposed to sunlight for prolonged periods of time and may be projected on an overhead projector for several hours without any noticeable change in the intensity and sharpness of the image areas and without any development of noticeable background coloration. The overhead projection generally causes the transparency to become heated to a temperature in the area of 150° F. and the present transparencies are stable at this temperature.

Variations and modifications may be made within the scope of the claims and portions of the improvements may be used without others.

We claim:

1. An assembly for producing an imaged projection transparency corresponding to an imaged original sheet in the thermographic process, comprising an acid-donor sheet and a coated projection transparency sheet which is receptive to the acid-donor layer and reactive therewith to form colored images corresponding to the images on the original sheet, said acid-donor sheet comprising a thin foundation sheet carrying a thin heat-transferable layer comprising a minor amount by weight of a resinous binder material which is heat-softenable at the temperature of the thermographic process and a major amount by weight of an aromatic acid, and said projection transparency sheet comprising a clear plastic film carrying a clear coating comprising a minor amount by weight of a substantially-colorless acid-sensitive dye precursor which develops an intense color upon reaction with said aromatic acid and a major amount by weight of a resinous binder material which comprises a mixture of from about 5% to about 40% by weight of a vinylidene chloride polymer and from about 60% to about 95% by weight of another synthetic thermoplastic resin which is compatible with said vinylidene chloride polymer, said coating being applied by means of a volatile solvent in which said dye precursor, said vinylidene chloride polymer and said synthetic thermoplastic resin are dissolved.

2. An assembly according to claim 1 in which the donor sheet has a thin plastic film foundation.

3. An assembly according to claim 1 in which the resinous binder material of the donor sheet comprises a butadiene copolymer.

4. An assembly according to claim 1 in which the dye precursor is present in an amount of from about 4% by weight to 10% by weight of the coating on the projection transparency film.

5. An assembly according to claim 1 in which the resinous binder material on the projection transparency sheet comprises a mixture of from about 10% to 15% by weight of a copolymer of vinylidene chloride and acrylonitrile and from about 85% to 90% by weight of a copolymer of styrene and acrylonitrile.

6. An assembly according to claim 1 in which the acid-donor sheet and the projection transparency sheet are releasably-attached to each other along one edge to provide a unit.

7. Thermographic process of producing a copy of an imaged original sheet on a projection transparency film by means of infrared radiation comprising the steps of:
  (a) superposing the original sheet in intimate surface contact with an assembly as defined in claim 1, the acid-donor layer being in contact with the dye precursor coating of the projection transparency sheet,
  (b) exposing said superposed sheets to a light source rich in infrared radiation to heat the original images and the corresponding areas of the assembly to soften the acid-donor layer and cause it to adhere to the dye precursor coating whereby the aromatic acid reacts with the dye precursor in said areas to form an intensely colored dye, and
  (c) separating the acid-donor sheet and the projection transparency film to provide the projection transparency film having intensely colored dye image areas corresponding to the image areas of the original sheet.

8. The process according to claim 7 in which the acid-donor layer comprises a butadiene copolymer binder material.

9. The process according to claim 7 in which the dye precursor coating comprises from about 4% to 10% by weight of the dye precursor.

10. The process according to claim 7 in which the binder material of the dye precursor coating comprises from about 10% to 15% by weight of a copolymer of vinylidene chloride and acrylonitrile and from about 85% to 90% by weight of a copolymer of styrene and acrylonitrile.

References Cited

UNITED STATES PATENTS

| 3,230,875 | 1/1966 | Newman | 117—36.2 |
| 3,476,578 | 11/1969 | Brinkman | 117—36.2 |
| 3,539,375 | 11/1970 | Baum | 117—36.2 |
| 3,483,013 | 12/1969 | Berg et al. | 117—36.2 |

MURRAY KATZ, Primary Examiner

U.S. Cl. X.R.

117—155 UA; 250—65 T